United States Patent
Hou (10) Patent No.: US 8,958,963 B2
(45) Date of Patent: Feb. 17, 2015

(54) SYSTEM AND METHOD FOR CONTROLLING THE PRESSURE OF HYDRAULIC FLUID SUPPLIED WITHIN A WORK VEHICLE TRANSMISSION

(71) Applicant: CNH America LLC, New Holland, PA (US)

(72) Inventor: Yanming Hou, Pleasant Prairie (CA)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/837,506

(22) Filed: Mar. 15, 2013

(65) Prior Publication Data

US 2013/0253787 A1    Sep. 26, 2013

Related U.S. Application Data

(60) Provisional application No. 61/615,488, filed on Mar. 26, 2012.

(51) Int. Cl.
| | | |
|---|---|---|
| *F16H 61/00* | (2006.01) | |
| *F16D 48/06* | (2006.01) | |
| *F16H 59/14* | (2006.01) | |
| *F16H 59/46* | (2006.01) | |

(52) U.S. Cl.
CPC .......... *F16H 61/0021* (2013.01); *F16D 48/066* (2013.01); *F16H 59/14* (2013.01); *F16H 2059/465* (2013.01); *F16D 2500/111* (2013.01); *F16D 2500/3024* (2013.01); *F16D 2500/30406* (2013.01); *F16D 2500/3065* (2013.01); *F16D 2500/30814* (2013.01); *F16D 2500/30822* (2013.01); *F16D 2500/50296* (2013.01); *F16D 2500/506* (2013.01); *F16D 2500/70406* (2013.01)
USPC .................. 701/68; 701/51; 701/58; 701/67; 192/48.601; 192/48.8; 477/37; 477/38; 477/39; 477/50

(58) Field of Classification Search
USPC ......................................................... 701/58
See application file for complete search history.

(56) References Cited

U.S. PATENT DOCUMENTS

| | | | | |
|---|---|---|---|---|
| 4,704,922 A | * | 11/1987 | Suketomo et al. | .............. 475/64 |
| 4,836,055 A | | 6/1989 | Suzuki | |
| 4,939,957 A | | 7/1990 | Asano et al. | |
| 6,022,293 A | * | 2/2000 | Dourra et al. | ................. 477/158 |
| 6,471,613 B1 | | 10/2002 | Botosan et al. | |
| 6,537,181 B2 | | 3/2003 | Asayama et al. | |
| 6,832,977 B2 | | 12/2004 | You | |
| 7,073,328 B2 | | 7/2006 | Knoblauch | |

(Continued)

FOREIGN PATENT DOCUMENTS

WO        WO9412363        6/1994

*Primary Examiner* — John R Olszewski
*Assistant Examiner* — Jeffrey Boomer
(74) *Attorney, Agent, or Firm* — Sue C. Watson (57) ABSTRACT

A method for controlling the pressure of hydraulic fluid supplied within a transmission of a work vehicle. The method may generally include receiving a signal associated with a load condition of the work vehicle, determining a desired pressure for the hydraulic fluid supplied within the transmission based on the load condition and controlling a valve such that hydraulic fluid is supplied within the transmission at the desired pressure, wherein the transmission includes an input shaft, a counter shaft and at least two driven shafts extending parallel to the input and counter shafts.

12 Claims, 4 Drawing Sheets

(56) References Cited

U.S. PATENT DOCUMENTS 7,164,981 B2 1/2007 Kim
2009/0112423 A1* 4/2009 Foster et al. .................. 701/60
2011/0035125 A1* 2/2011 Sasahara et al. ............... 701/58

* cited by examiner

SYSTEM AND METHOD FOR CONTROLLING THE PRESSURE OF HYDRAULIC FLUID SUPPLIED WITHIN A WORK VEHICLE TRANSMISSION

CROSS-REFERENCE TO RELATED APPLICATIONS

This application claims priority from and the benefit of U.S. Provisional Patent Application No. 61/615,488, entitled "System and Method For Controlling The Pressure Of Hydraulic Fluid Supplied Within A Work Vehicle Transmission," filed Mar. 26, 2012, which is hereby incorporated by reference in its entirety.

FIELD OF THE INVENTION

The present subject matter relates generally to work vehicles and, more particularly, to a system and method for controlling the pressure of hydraulic fluid supplied within the transmission of a work vehicle.

BACKGROUND OF THE INVENTION

Higher vehicle efficiency has been vigorously pursued by design engineers for all vehicles. Excessive parasitic power losses can generate multiple detrimental effects in vehicle operations, including lower effective working powers, decreased cooling efficiency, higher operating costs, increased noise and increased production of environmental pollutants.

Parasitic power losses for work vehicles, such as agricultural vehicles, earth-moving vehicles, off-road vehicles, loaders and/or the like, typically come from multiple sources. For example, for work vehicles equipped with power shift transmissions and/or continuously variable transmissions, one major source for power losses derives from the hydraulic system used to control the transmission pressure. Typically, the hydraulic system includes a pressure control valve configured to control the pressure of the hydraulic fluid supplied within the transmission at a fixed pressure value. This fixed pressure value typically corresponds to the pressure that is required to maintain the transmission clutches engaged when the work vehicle is operating at its maximum torque load (i.e., the pressure required to prevent clutch slippage at the vehicle's most severe loading conditions). However, more often than not, work vehicles are operated well below their maximum torque load. Thus, by maintaining the pressure of the hydraulic fluid at such a high, fixed pressure value even when a work vehicle is operating at lower load conditions, conventional hydraulic systems generate excessive power losses.

Accordingly, a system and method for controlling the pressure of hydraulic fluid supplied within a work vehicle transmission that reduces the vehicle's power losses would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the pressure of hydraulic fluid supplied within a transmission of a work vehicle. The method may generally include receiving a signal associated with a load condition of the work vehicle, determining a desired pressure for the hydraulic fluid supplied within the transmission based on the load condition and controlling a valve such that hydraulic fluid is supplied within the transmission at the desired pressure, wherein the transmission includes an input shaft, a counter shaft and at least two driven shafts extending parallel to the input and counter shafts.

In another aspect, the present subject matter is directed to a system for controlling the pressure of hydraulic fluid supplied within a transmission of a work vehicle. The system may generally include an engine and a transmission coupled to the engine. The transmission may include an input shaft, a counter shaft and at least two driven shafts extending parallel to the input and counter shafts. The transmission may also include a plurality of clutches associated with the at least two driven shafts. Additionally, the system may include at least one valve and a controller communicatively coupled to the at least one valve. The at least one valve may be configured to regulate the pressure of hydraulic fluid supplied within the transmission. Moreover, the controller may be configured to monitor a load condition of at least one of the engine or the transmission and determine a desired pressure for the hydraulic fluid based on the load condition. In addition, the controller may be configured to control the at least one valve such that hydraulic fluid is supplied within the transmission at the desired pressure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the pressure of hydraulic fluid supplied within a transmission of a work vehicle. Specifically, in several embodiments, the system may include a controller configured to continuously monitor the load condition of the work vehicle, such as by receiving signals from torque sensors associated with the torque load of the engine and/or the transmission of the work vehicle. In addition, the system may utilize one or more valves (e.g., proportional valves) to electronically control the pressure of the hydraulic fluid supplied within the transmission based on the load condition of the work vehicle. For instance, the controller of the system may be configured to calculate, in real time, the minimum pressure required to carry the torque loads associated with the current load condition and subsequently control the valve(s) such that only the minimum pressure is generated and supplied within the transmission.

It should be appreciated that the present subject matter may generally be utilized to enhance the overall efficiency of any work vehicle. Specifically, unlike conventional hydraulic systems that maintain the pressure of the hydraulic fluid supplied within the transmission to a fixed value (i.e., the pressure required to maintain the transmission clutches engaged when the work vehicle is operating at its maximum torque load), the disclosed system dynamically adjusts the pressure of the hydraulic fluid based on the load condition of the work vehicle. As such, the parasitic power losses associated with excessive pressures within the system may be reduced. In addition, the present subject matter may also provide numerous other advantages for a work vehicle, such as improving the efficiency of the vehicle's cooling system, reducing the amount of noise generated by the vehicle (e.g., hydraulic noise and/or cooling noise) and reducing heat-induced aging of the vehicle's components.

Figure 1:
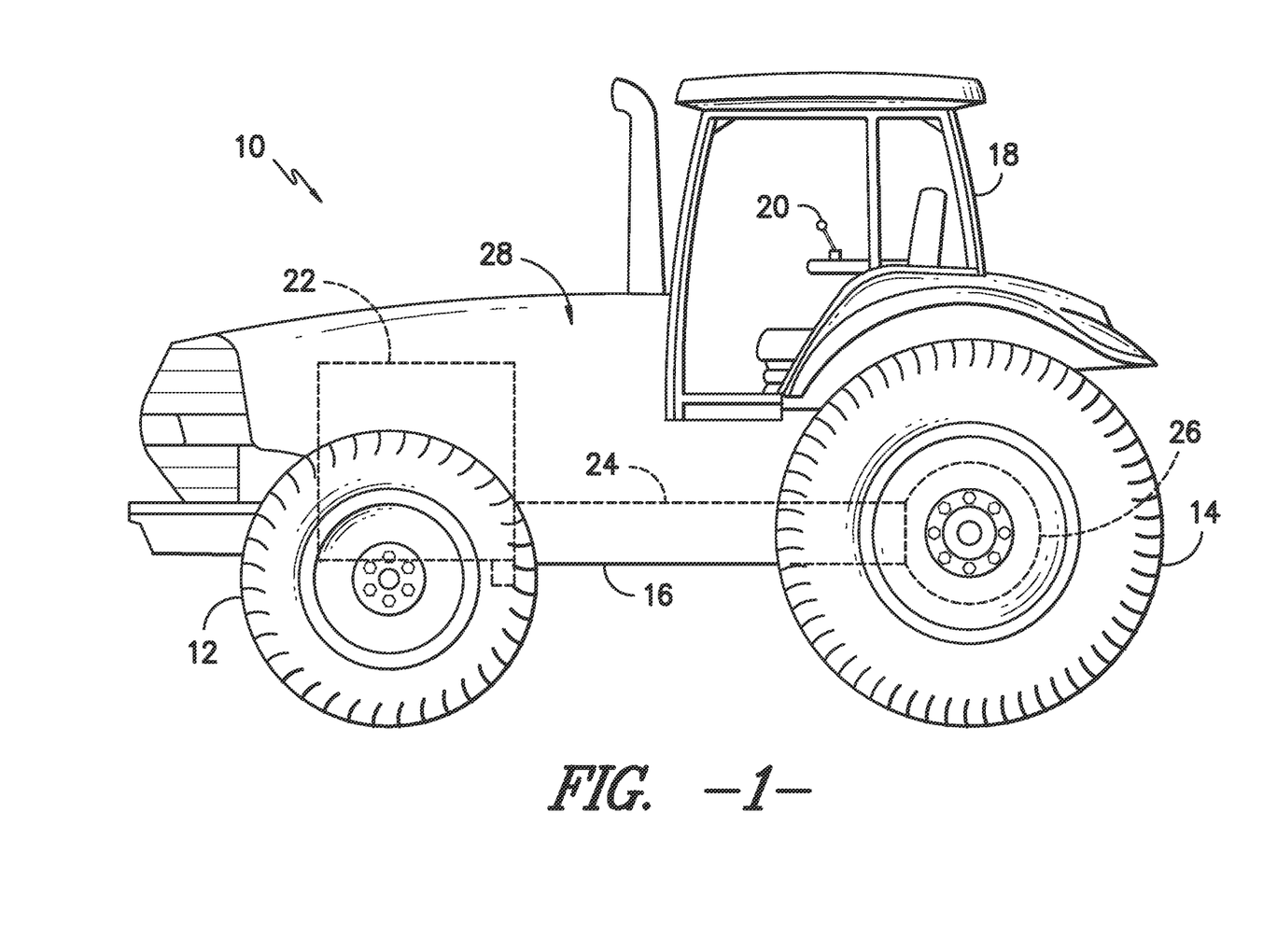
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. For instance, one or more of the control devices 20 may comprise up/downshift buttons to allow operator initiated gear changes. Additionally, the work vehicle 10 may include an engine 22 and a transmission 24 mounted on the chassis 16. The transmission 24 may be operably coupled to the engine 22 (e.g., via a damping coupler) and may provide variably adjusted gear ratios for transferring engine power to the wheels 14 via a differential 26. The engine 22, transmission 24, and differential 26 may collectively define a drive train 28 of the work vehicle 10.

It should be appreciated that the transmission 24 may generally comprise any suitable transmission known in the art having a plurality of different, fixed gear ratios. For example, in several embodiments, the transmission 24 may comprise a multispeed, manual power shift transmission having a plurality of selectable gear ratios (e.g., a plurality of selectable forward and reverse gear ratios) and a plurality of hydraulically actuated clutches that may be selectively actuated in order to engage the transmission in the differing gear ratios. In such embodiments, the clutches may be configured to be automatically engaged within the transmission 24. For instance, an electronic controller 102, 104 of the work vehicle 10 (described below with reference to FIG. 3) may be configured to transmit suitable control commands or signals to the transmission 24 instructing it to actuate hydraulic pistons or other suitable actuators configured to engage/disengage the clutches. In other embodiments, the transmission 24 may comprise any other transmission suitable for use with a work vehicle 10, such as a continuously variable transmission.

It should also be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
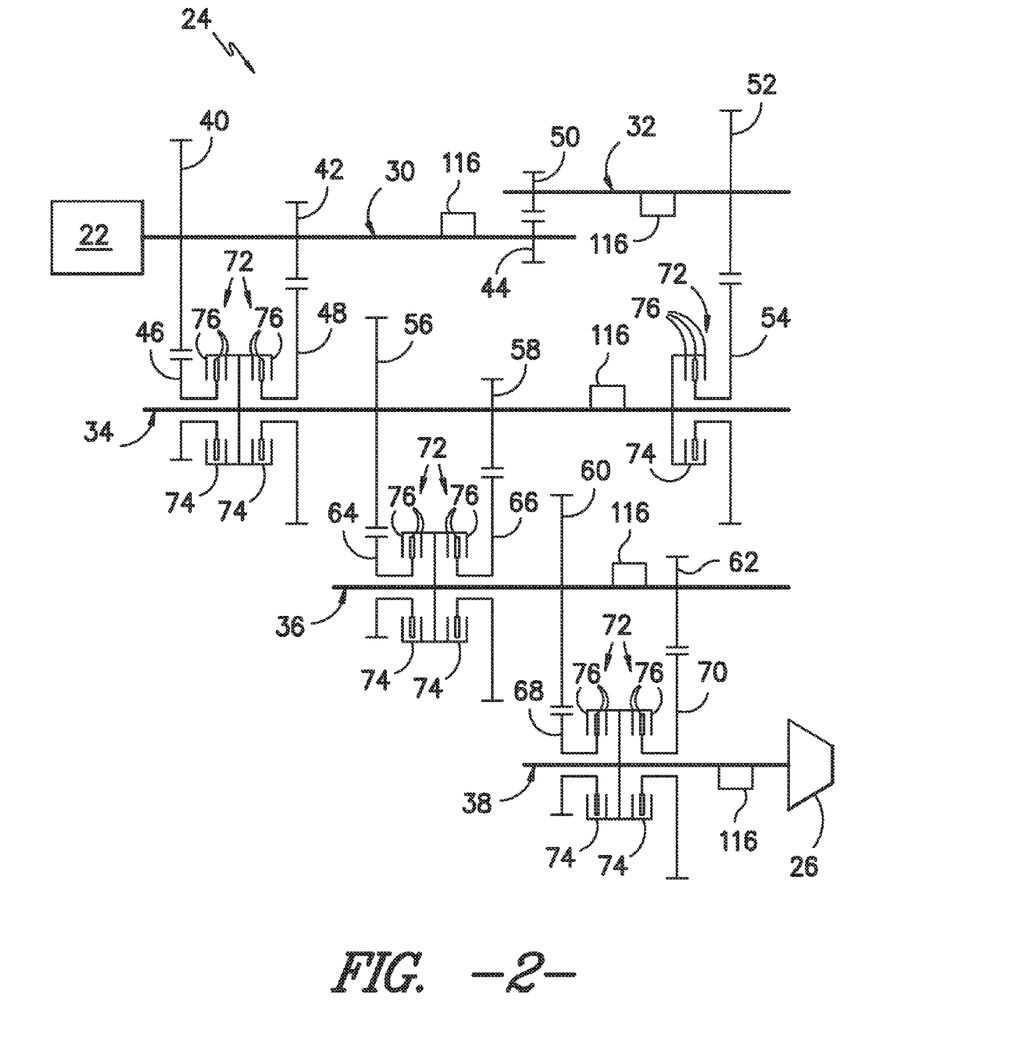
FIG. 2 illustrates a simplified, schematic view of one embodiment of a transmission suitable for use within the work vehicle shown in FIG. 1.

Referring now to FIG. 2, a simplified, schematic diagram of one embodiment of a transmission 24 suitable for use with the work vehicle 10 described above is illustrated in accordance with aspects of the present subject matter. As shown, the transmission 24 includes a plurality of shafts extending parallel to one another. For example, the transmission 24 may include an input shaft 30 operably connected to and driven by the engine 22. The transmission 24 may also include a counter shaft 32 extending parallel to the input shaft 30 for facilitating the reverse gear ratios of the transmission 24. In addition, the transmission 24 may include a plurality of driven shafts 34, 36, 38 extending parallel to the input and counter shafts 30, 32, with the driven shafts 34, 36, 38 forming different levels of direct gear engagements for adjusting the gear ratio of the transmission 24. For instance, as shown in the illustrated embodiment, the transmission 24 includes a first driven shaft 34 forming a first level of direct gear engagements, a second driven shaft 36 forming a second level of direct gear engagements and a third driven shaft 38 (i.e., an output shaft coupled to the differential 26) forming a third level of direct gear engagements. However, in alternative embodiments, the transmission 24 may include any other number of driven shafts forming a corresponding number of direct gear engagement levels. For example, in various embodiments, the transmission 24 may only include two driven shafts forming two levels of direct gear engagements or the transmission 24 may include four or more driven shafts forming four or more levels of direct gear engagements.

Moreover, the transmission 24 may also include a plurality of gears installed on the parallel shafts 30, 32, 34, 36, 38. For example, as shown in the illustrated embodiment, the transmission 24 includes eight pairs of gears configured to provide eight forward gear ratios and four reverse ratios. Specifically, as shown in FIG. 2, the transmission 24 may include a first input gear 40, a second input gear 42 and a third input gear 44 mounted to the input shaft 30. The first input gear 40 may drive a first forward gear 46 configured to be selectively engaged with the first driven shaft 34. Similarly, the second input gear 42 may drive a second forward gear 48 configured to be selectively engaged with the first driven shaft 34. The third input gear 44 may generally be configured to drive the counter shaft 32. For example, as shown in FIG. 2, the counter shaft 32 may include a first counter gear 50 and a second counter gear 52 mounted thereon, with the first counter gear 50 being driven by the third input gear 44. The second counter gear 52 may, in turn, drive a reverse gear 54 configured to be selectively engaged with the first driven shaft 34.

Additionally, the transmission 24 may include first and second drive gears 56, 58 mounted to the first driven shaft 34 and third and fourth drive gears 60, 62 mounted to the second driven shaft 36. The drive gears 56, 58, 60, 62 may generally be adapted to drive corresponding driven gears 64, 66, 68, 70 configured to be selectively engaged with the second and third driven shafts 36, 38. For example, as shown in the illustrated embodiment, the first drive gear 56 may drive a first driven gear 64 configured to be selectively engaged with the second driven shaft 36 and the second drive gear 58 may drive a second driven gear 66 configured to be selectively engaged with the second driven shaft 36. Similarly, the third drive gear 60 may drive a third driven gear 68 configured to be selectively engaged with the third driven shaft 38 and the fourth drive gear 62 may drive a fourth driven gear 70 configured to be selectively engaged with the third driven shaft 38.

It should be appreciated that, in alternative embodiments, the transmission 24 may include any other number of gear pairs configured to provide any suitable number of forward and reverse gear ratios. For instance, in some work vehicles, it may be desirable for the transmission 24 to include a larger number of gear pairs, thereby providing a larger number of forward and/or reverse gear ratios (e.g., 24 or more forward ratios), to accommodate complicated loading conditions.

Moreover, as shown in FIG. 2, the transmission 24 may also include a plurality of hydraulically actuated clutches 72 for engaging the gear pairs with the driven shafts 34, 36, 38. Specifically, each clutch 72 may be associated with one of the gears configured to be selectively engaged with one of the driven shafts 34, 36, 38 (e.g., the first forward gear 46, the second forward gear 48, the reverse gear 54, and the first, second, third and fourth driven gears 64, 66, 68, 70). In several embodiments, each clutch 72 may include one or more hydraulic pistons or other suitable hydraulic actuators 74 configured to engage corresponding friction plates 76 coupled to both the gear and the driven shaft. Thus, when pressurized hydraulic fluid is supplied within the clutch 72, the friction plates 76 may be pressed together such that the plates 76 frictionally and rotationally engage one another, thereby permitting torque to be transmitted between two of the parallel shafts 30, 32, 34, 36, 38. For example, by actuating the clutch 72 associated with the first forward gear 46, torque may be transmitted from the input shaft 30 to the first driven shaft 34 via the gear pair including first input gear 40 and the first forward gear 46. Similarly, torque may be transmitted from the first driven shaft 34 to the second driven shaft 36 and from the second driven shaft 36 to the third driven shaft 38 by actuating one of the clutches 72 associated with each of such driven shafts 36, 38. Thus, by varying the combination of actuated clutches 72 within the transmission 24 (i.e., one clutch 72 per driven shaft 34, 36, 38), the transmission 24 may be engaged in various different gear ratios.

It should be readily appreciated by those of ordinary skill in the art that the transmission 24 described above and shown in FIG. 2 differs substantially, both structurally and functionally, from transmissions used in highway vehicles, such as cars. For example, manual transmissions used in highway vehicles only include a single level of direct gear engagements, with multiple gear pairs being arranged solely on two parallel shafts (i.e., an input shaft and an output shaft). Thus, unlike the transmission 24 described above, a single gear pair is engaged at any given time to achieve a fixed gear ratio. Such a simplified configuration may be suitable for highway vehicles, but it is typically not sufficient to provide the variable gear ratios needed to sustain the extreme and dynamic torque loads occurring during operation of a work vehicle. For instance, the torque load transmitted through the drive train of a work vehicle is typically 10 to 30 times larger than the torque load transmitted through the drive train of a highway vehicle. Moreover, while the torque load for a highway vehicle is relative steady, the torque load for a work vehicle may continuously change as the drive train is subjected to dynamic, shock loads from unstable field conditions (e.g., ditches, rough spots, rocks, etc.,) and/or from work implements being hauled by the work vehicle.

Additionally, transmissions used in highway vehicles utilize a torque converter (for an automatic transmission) or an engaging clutch (for a manual transmission) to couple the engine to the transmission. However, as indicated above, the transmission 24 of a work vehicle 10 may be directly coupled to the engine 22 (e.g., via a damping coupling secured to the engine flywheel). This direct coupling provides a more rigid drive train capable of handling the increased torque loads of a work vehicle.

Figure 3:
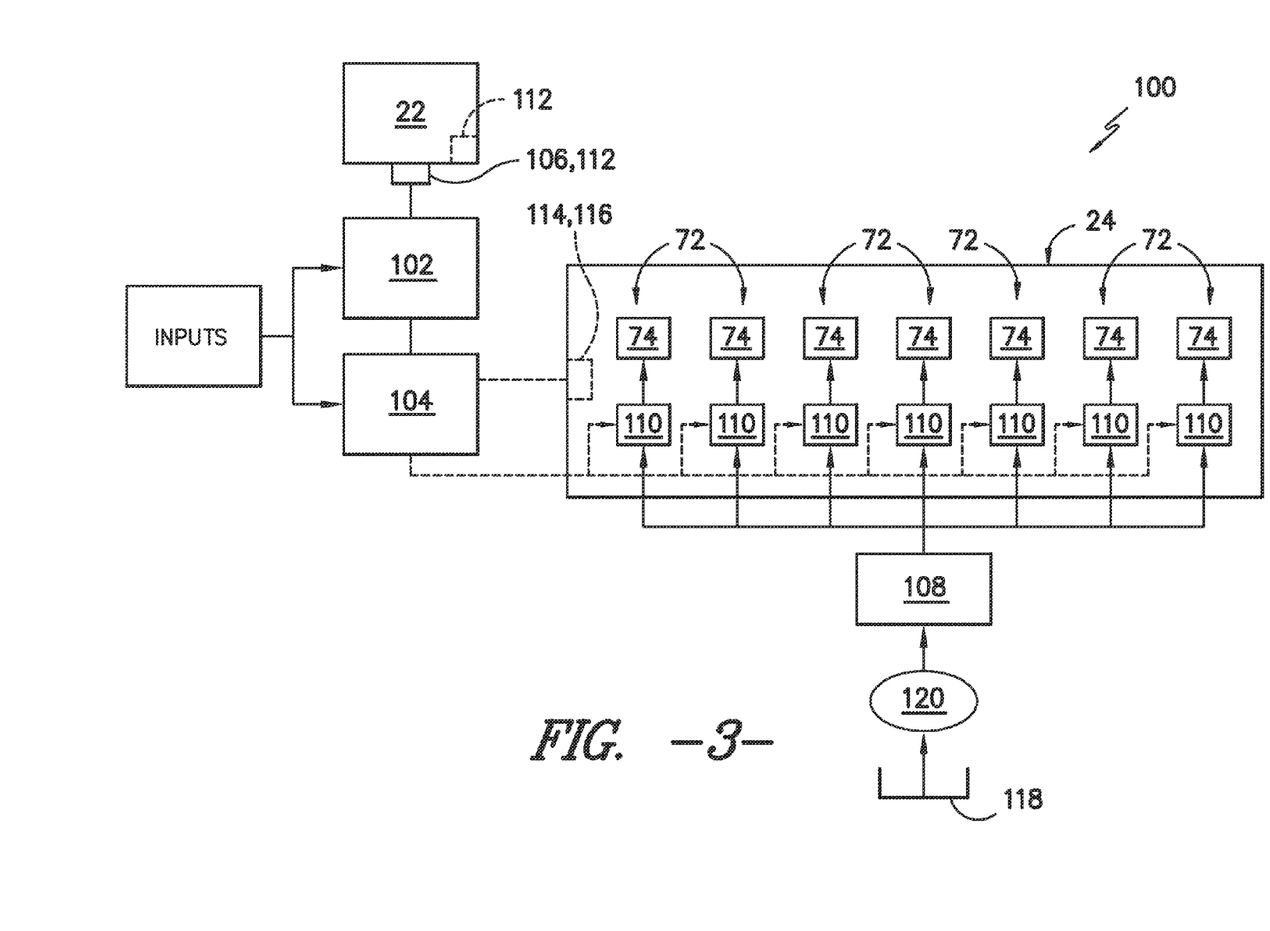
FIG. 3 illustrates a schematic view of one embodiment of a system for controlling the pressure of hydraulic fluid supplied within a transmission of a work vehicle.

Referring now to FIG. 3, a schematic diagram of one embodiment of a system 100 for controlling the pressure of hydraulic fluid supplied within a transmission 24 of a work vehicle 10 is illustrated in accordance with aspects of the present subject matter. As shown, the system 100 includes an engine controller 102 configured to control the operation of the engine 22 and a transmission controller 104 configured to control the operation of the transmission 24. For instance, the engine controller 102 may be communicatively coupled to an engine governor 106 in order to control and/or monitor the speed of the engine 22. Similarly, as will be described in greater detail below, the transmission controller 104 may be communicatively coupled to one or more valves (e.g., a system valve 108 and a plurality of clutch valves 110) in order to control the pressure of the hydraulic fluid supplied within the transmission 24, thereby permitting the transmission controller 104 to control the engagement and/or disengagement of the various clutches 72 of the transmission 24.

Additionally, the system 100 may include one or more sensors 112, 114 configured to monitor a load condition of the work vehicle 10. For example, in several embodiments, the load condition may be monitored by continuously monitoring the torque load transmitted through the engine 22 and/or the transmission 24. In such embodiments, the controller(s) 102, 104 may be communicatively coupled to one or more torque sensors 112, 114 configured to monitor the torque loads transmitted through such components. For example, as shown in FIG. 3 the engine controller 102 may be communicatively coupled to a first torque sensor 112 mounted on and/or within the engine 22 for monitoring the torque loads of the engine 22. In one embodiment, the first torque sensor 112 may comprise an internal torque sensor of the engine governor 106. In another embodiment, the first torque sensor 112 may comprise a separate torque sensor (shown in dashed lines) configured to monitor the torque loads of the engine 22. Similarly, as shown in FIG. 3, in addition to the first torque sensor 112 or as an alternative thereto, the transmission controller 104 may be communicatively coupled to a second torque sensor 114 mounted within the transmission 24 for monitoring the torque loads of the transmission 24. For instance, the second torque sensor 114 may be mounted within the transmission 24 so as to monitor the torque loads transmitted through one or more of its shafts 30, 32, 34, 36, 38.

It should be appreciated that, in alternative embodiments, the torque loads transmitted through the engine 22 and/or the transmission 24 may be determined using any other suitable means and/or method known in the art. For instance, in addition to the first torque sensor 112 or as an alternative thereto, the engine torque may be calculated using the fuel rate of the fuel supplied to the engine 22. Specifically, as is generally understood, based on the burning efficiency of the engine 22 under various operating conditions (e.g., engine speed, intake temperature and/or various other engine parameters), the torque transmitted through the engine 22 may be accurately estimated.

Moreover, the system 100 may also include one or more sensors 116 configured to monitor the rotational speeds of the various shafts 30, 32, 34, 36, 38 of the transmission 24. For example, as shown in FIGS. 2 and 3, the transmission 24 may, in one embodiment, include one or more speed sensors 116 (e.g., shaft encoders, shaft sensors and/or any other suitable speed sensors) mounted to and/or within each shaft 30, 32, 34, 36, 38 so as to measure the rotational shaft speeds. The speed sensors 116 may, in turn, be communicatively coupled to the controller(s) 102, 104 to permit the speed measurements to be transmitted to the controller(s) 102, 104 for subsequent processing and/or analysis.

It should be appreciated that the engine controller 102 may be coupled to the transmission controller 104 via a CAN bus or other suitable communicative link. As such, any control signals generated by either controller 102, 104 and/or measurement signals provided by the sensors 112, 114, 116 may be transmitted between the controllers 102, 104.

It should also be appreciated that each controller 102, 104 may generally comprise any suitable computer and/or other processing unit, including suitable combinations of computers and/or other processing units. Thus, in several embodiments, each controller 102, 104 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of each controller 102, 104 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controllers 102, 104 to perform various computer-implemented functions, such as by performing the steps and/or calculations of the method described below with reference to FIG. 4. In addition, the controllers 102, 104 may also include various other suitable components, such as a communications circuit or module, one or more input/output channels for receiving input signals (e.g., from the sensors 112, 114, 116) and/or for transmitting control signals, a data/control bus coupling the components of the controllers 102, 104 together and/or the like.

Referring still to FIG. 3, the disclosed system 100 may also include various components for supplying hydraulic fluid into and/or within the transmission 24. For example, as shown in the illustrated embodiment, the system 100 may include a holding tank 118 configured to hold or otherwise contain the hydraulic fluid to be supplied within the transmission 24. In addition, the system 100 may include a pump 120 configured to transfer the hydraulic fluid from the holding tank 118 to a pressure control valve 108 (hereinafter referred to as the "system valve 108") positioned downstream of the pump 120. The system valve 108 may be communicatively coupled to the controller(s) 102, 104 such that the operation of the valve 108 may be electronically controlled in order to regulate the pressure of the hydraulic fluid supplied to the clutches 72 of the transmission 24. Thus, it should be appreciated that the system valve 108 may generally comprise any suitable electronic valve that may be configured to provide a variable pressure output. For example, in one embodiment, the system valve 108 may comprise an electronic, solenoid activated proportional valve or any other suitable variable pressure control valve.

By controlling the operation of the system valve 108, the controller(s) 102, 104 may be configured to regulate the particular pressure at which the hydraulic fluid is supplied to all of the clutches 72 (hereinafter referred to as the "system pressure"). In addition, the controller(s) 102, 104 may also be configured to individually regulate the pressure of the hydraulic fluid supplied within each clutch 72. Specifically, as shown in FIG. 3, each clutch 72 may include an individual clutch valve 110 configured to regulate the pressure of the hydraulic fluid supplied to its corresponding hydraulic actuator 74 (hereinafter referred to as the "clutch pressure"). Each clutch valve 110 may be communicatively coupled to the controller(s) 102, 104 such that the operation of the valve 110 may be electronically controlled. Thus, when a particular clutch 72 is to be actuated within the transmission 24, its clutch valve 110 may be controlled so as to supply hydraulic fluid to the corresponding actuator 74 at a given clutch pressure.

Similar to the system valve 108 described above, it should be appreciated that the clutch valves 110 may generally comprise any suitable electronic valve that may be configured to provide a variable pressure output. For example, in one embodiment, each clutch valve 110 may comprise an electronic, solenoid activated proportional valve or any other suitable variable pressure control valve.

During operation of the disclosed system 100, the controller(s) 102, 104 may be configured to receive various system inputs. For instance, in several embodiments, the controller(s) 102, 104 may be configured to receive gear shift commands (e.g., from one or more of the control devices 20 housed within the cab 18) associated with operator initiated gear changes. Upon receipt of a gear shift command, the controller(s) 102, 104 may be configured to transmit suitable control commands to the clutch valves 110 for disengaging and/or engaging the clutches 72 of the transmission 24. For instance, in the embodiment shown in FIG. 2, the controller(s) 102, 104 may, for any given gear change, disengage up to three clutches 72 and engage up to three clutches 72. Thus, for the clutch(es) 72 being disengaged during the gear change, the controller(s) 102, 104 may transmit suitable control signals to the associated clutch valve(s) 110 so that the hydraulic pressure to such clutch(es) 72 is progressively cut-off, thereby disengaging the associated gear(s) within the transmission 24. Similarly, for the clutch(es) 72 being engaged during the gear change, the controller(s) 102, 104 may transmit suitable control signals to the associated valve(s) 110 so that the hydraulic pressure to such clutch(es) is progressively increased, thereby engaging the associated gear(s) within the transmission 24.

By individually controlling the operation of the clutch valves 110, the controller(s) 102, 104 may be configured to regulate the clutch pressure of the hydraulic fluid supplied within each clutch 72. Similarly, by controlling the operation of the system valve 108, the controller(s) 102, 104 may be configured to regulate the system pressure of the hydraulic fluid supplied to all of the clutches 72. In addition, as will be described below, the clutch pressures and/or the system pressure may be dynamically adjusted by the controller(s) 102, 104 in order to accommodate varying load conditions of the work vehicle 10. As such, the pressures within the transmission 24 may be maintained at the minimum values required to transmit torque through the transmission 24 without causing clutch slippage, thereby enhancing the overall efficiency of the work vehicle 10.

Figure 4:
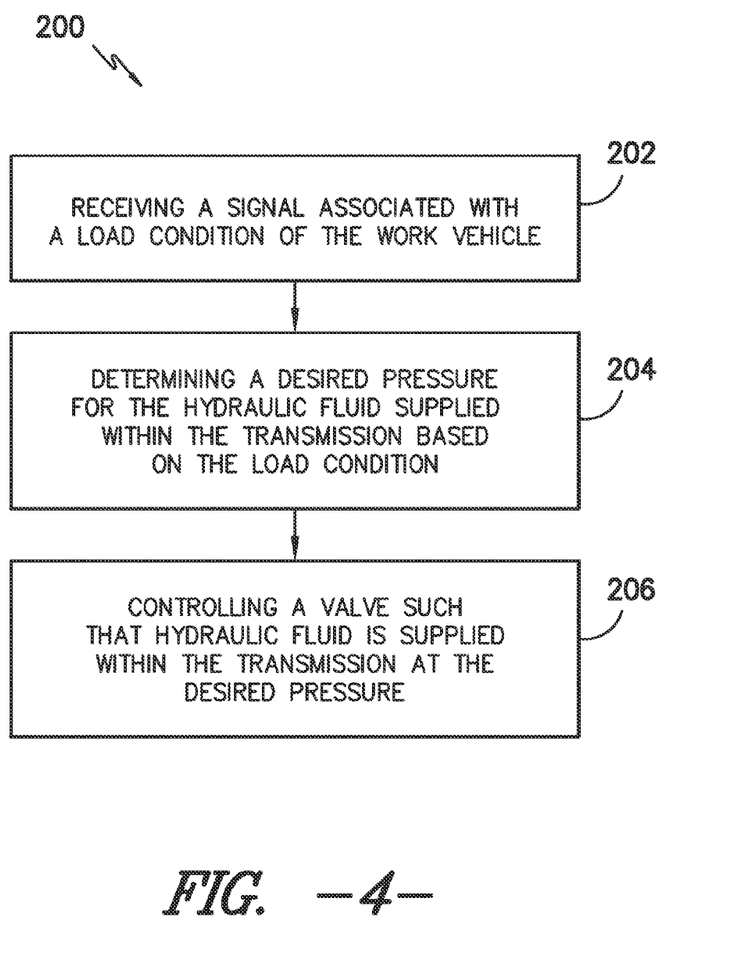
FIG. 4 illustrates a flow diagram of one embodiment of a method for controlling the pressure of hydraulic fluid supplied within a transmission of a work vehicle.

Referring now to FIG. 4, a flow diagram of one embodiment of a method 200 for controlling the pressure of hydraulic fluid supplied within a transmission 24 of a work vehicle 10 is illustrated in accordance with aspects of the present subject matter. As shown, the method 200 generally includes receiving a signal associated with a load condition of the work vehicle 202, determining a desired pressure for the hydraulic fluid supplied within the transmission based on the load condition 204 and controlling a valve such that the hydraulic fluid supplied within the transmission is at the desired pressure 206.

As shown in FIG. 4, in 202, a signal may be received that is associated with a load condition of the work vehicle 10. For example, as described above, the engine controller 102 and/or the transmission controller 104 may be coupled to one or more torque sensors 112, 114 configured to monitor torque loads within the engine 22 and/or the transmission 24. Thus, the controller(s) 102, 104 may be configured to continuously receive signals from the torque sensor(s) 112, 114 associated with the toque loads of the work vehicle 10, thereby permitting the controller(s) 102, 104 to monitor the load condition of the work vehicle 10 in real-time.

Additionally, in 204, a desired pressure for the hydraulic fluid supplied within the transmission 24 may be determined based on the load condition of the work vehicle 10. For instance, in several embodiments, the load condition of the work vehicle 10 may be continuously analyzed by the controller(s) 102, 104 in order to calculate desired clutch pressures for the engaged clutches 72 of the transmission 24 (i.e., the clutches 72 engaged simultaneously within the transmission 24 in order to achieve a desired gear ratio). Such desired clutch pressures may then be utilized to determine the desired system pressure. For example, in one embodiment, the desired system pressure may be set such that the system pressure is maintained at a higher pressure than the maximum desired clutch pressure at any given moment.

In several embodiments, the desired clutch pressure for each engaged clutch 72 may generally correspond to the minimum pressure required at the current load condition to allow torque to be transmitted through such clutch 72 without causing it to slip. Specifically, for a given hydraulically actuated clutch 72, its torque carrying capacity may be proportional to the hydraulic pressure applied through the clutch 72. For example, in many instances, the relationship between torque carrying capacity and hydraulic pressure for a given clutch 72 may be expressed using equation (1):

$$TL = k * NFP * AFP * HPR \quad \text{equation (1)}$$

wherein, TL corresponds to the torque carrying capacity of or the torque load transmitted through a given clutch 72, k corresponds to a constant that is proportional to the friction coefficient of the friction plates 76 of the clutch 72, NFP corresponds to total the number of friction plates 76 within the clutch 72, AFP corresponds to the working area of the friction plates 76 and HPR corresponds to the hydraulic pressure supplied within the clutch 72.

It should be appreciated that the friction coefficient of the friction plates 76 (i.e., the constant k), the number of friction plates 76 and the working area of the friction plates 76 for a given clutch 72 may all correspond to known features of the mechanical components of the clutch 72 and, thus, may be stored within the controller(s) 102, 104 of the work vehicle 10. Accordingly, by utilizing the relationship shown in equation (1), the minimum pressure required to carry the current torque load may be automatically determined by the controller(s) 102, 104 for any clutch 72. For example, in the embodiment shown in FIG. 2, the transmission 24 must, at any given moment, include three engaged clutches 72 (one for each driven shaft 34, 36, 38) in order to transmit torque through the transmission 24. Thus, by continuously monitoring the toque loads of the work vehicle 10, a desired clutch pressure may be continuously determined for each of the three engaged clutches 72.

Additionally, it should be appreciated that the torque load transmitted through each engaged clutch 72 may differ at any given moment due to the varying rotational speeds of each driven shaft 34, 36, 38. As such, in several embodiments, a desired clutch pressure may be determined for each engaged clutch 72 based on the specific torque load transmitted through such clutch 72. For instance, assuming that the power losses from one driven shaft to another are negligible, the horsepower carried by each engaged clutch 72 is the same. Thus, by monitoring the rotational speed of each driven shaft 34, 36, 38 (e.g., by using the speed sensors 116 described above), the torque load transmitted through each engaged clutch 72 may be determined, which may then be used to determine the desired clutch pressure for each engaged clutch 72. For example, in one embodiment, the horsepower carried by each engaged clutch 72 may be related to torque load and rotational speed using equation (2) below:

$$HP = TL * RS \quad \text{equation (2)}$$

wherein, HP corresponds to the horsepower carried by a given clutch 72, TL corresponds to the torque load transmitted through the given clutch 72 and RS corresponds to the rotational speed of the driven shaft 34, 36, 38 associated with the given clutch 72.

By determining the desired clutch pressure for each engaged clutch 72 based on the current load condition of the work vehicle 10, the desired system pressure may then be set such that hydraulic fluid is supplied to the clutches 72 at a pressure that is equal to or greater than the maximum desired clutch pressure at any given moment. For instance, in one embodiment, the desired system pressure may be set at a predetermined percentage above the maximum desired clutch pressure at any given moment, such as by setting the desired system pressure at a percentage above the maximum desired clutch pressure ranging from about 1% to about 15%, such as from about 1% to about 10% or from about 5% to about 10% and all other subranges therebetween. Such increased system pressure may be utilized as a safety factor to accommodate sudden load increases, whereby the clutch pressures may need to be increased very quickly.

Additionally, in several embodiments, it may be desirable to maintain the system pressure above a minimum pressure threshold, regardless of the maximum desired clutch pressure, to ensure that the work vehicle 10 continues to operate normally. For instance, in one embodiment, the minimum pressure threshold for the system pressure may correspond to a pressure that ranges from about 40% to about 50% of the maximum system pressure (i.e., the pressure required to maintain the transmission clutches 72 engaged when the work vehicle 10 is operating at its maximum torque load).

However, it is foreseeable that, in alternative embodiments, the minimum pressure threshold may correspond to a pressure that is less than about 40% of the maximum system pressure or greater than about 50% of the maximum system pressure.

Referring still to FIG. 4, in 206, a valve 108, 110 may be controlled such that hydraulic fluid is supplied within the transmission 24 at the desired pressure. For instance, as described above, the controller(s) 102, 104 may be configured to transmit suitable control signals to the system valve 108 so as to control the operation of such valve 108, thereby permitting the controller(s) to regulate the system pressure of the hydraulic fluid supplied to all of the clutches 72. Similarly, the controller(s) 102, 104 may also be configured to transmit suitable control signals to the individual clutch valves 72 so as to control the operation of such valves 72, thereby permitting the controller(s) to regulate the clutch pressures of the hydraulic fluid supplied within the clutches 72. Thus, the controller(s) may be configured to dynamically adjust both the system pressure and/or the clutch pressures based on the current load condition of the work vehicle 10 in order to maintain the pressures within the system 100 at the minimum values needed to carry torque through the transmission 24 without causing clutch slippage. As such, the parasitic power losses of the work vehicle 10 may be significantly reduced, thereby enhancing the overall efficiency of the work vehicle 10.

It should be appreciated that, in several embodiments, the system pressure and/or the clutch pressures may also be dynamically adjusted based on future load conditions of the work vehicle 10. In particular, the controller(s) 102, 104 of the disclosed system 100 may be configured to implement suitable forecasting logic in so as to predict the future load conditions of the work vehicle 10. For instance, in one embodiment, the controller(s) 102, 104 may be configured to store several of the previous torque loads for the work vehicle 10 (e.g., the past 5 to 10 torque measurements provided by the torque sensor(s) 112, 114) and determine a recent trend for such torque loads, such as by determining a best-fit or trend line for the previous torque load measurements. In such an embodiment, if the trend indicates that torque loads have been increasing over time and, thus, are likely to continue increasing in the future, then the system pressure and/or the clutch pressures may be increased in order to accommodate the expected increase in future torque loads. Similarly, if the trend indicates that torque loads have been decreasing over time and, thus, are likely to continue decreasing in the future, then the system pressure and/or the clutch pressures may be maintained at its(their) current level(s) or decreased in accordance with the expected decrease in future torque loads.

In addition, the system pressure may also be dynamically adjusted based on the characteristics of past load conditions of the work vehicle 10. Specifically, the controller(s) 102, 104 may be configured to implement suitable learning logic in order to permit the controller(s) 102, 104 to analyze how the vehicle's load condition has changed over time. For instance, in one embodiment, the controller(s) 102, 104 may be configured to analyze the frequency and/or the amplitude of the vehicle's torque load fluctuations over a specific period of time (e.g., over the last 5 to 10 minutes of the vehicle's operation) and, based on such information, determine the likelihood of sudden torque load changes in the future. For example, if the frequency and/or the amplitude of past torque load fluctuations is high, it may indicate that the work vehicle 10 is operating under conditions that may cause continuous torque load changes, such as when the vehicle is operating under unstable field conditions (e.g., due to bumps, rocks, ditches and/or the like) or when dynamic loads are being transmitted from a work implement being pulled by the work vehicle 10. As such, the safety factor or difference between the system pressure and the clutch pressures may be increased (e.g., by setting the desired system pressure to a larger percentage, such as 10% to 15%, above the maximum desired clutch pressure) to ensure that the system 100 will be able to accommodate any sudden and/or large changes in the torque load. However, if the frequency and/or the amplitude of past torque load fluctuations is low, it may indicate that the work vehicle is operating under stable conditions, such as when the vehicle is traveling on a road or when the vehicle operating in a flat, non-bumpy field. Thus, the safety factor or difference between the system pressure and the clutch pressures may be decreased (e.g., by setting the desired system pressure to a smaller percentage, such as 1% to 5%, above maximum desired clutch pressure) to further enhance the efficiency of the work vehicle 10.

Moreover, the system pressure and/or the clutch pressures may also be adjusted when it is determined that one or more of the engaged clutches 72 is slipping. For instance, the controller(s) 102, 104 may be configured to detect clutch slippage by comparing an actual gear ratio for each clutch 72 to an expected gear ratio stored within the memory of the controller(s) 102, 104. Specifically, by monitoring the rotational speeds of the shafts 30, 32, 34, 36, 38 of the transmission 24 (e.g., by using the speed sensors 116 described above), the controller(s) 102, 104 may be configured to determine the actual gear ratio for each clutch 72. If the actual gear ratio for a particular clutch 72 differs from the expected gear ratio by a certain degree (e.g., beyond that which may attributed to signal noise), it may be determined that the clutch 72 is slipping. In such case, the clutch pressure for the slipping clutch 72, as well as the system pressure, may be increased (e.g., by an amount proportional to the slipping rate of the clutch 72) in order to prevent future slippage and ensure that the maximum torque load is transmitted through the clutch 72.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling pressure of hydraulic fluid supplied within a transmission of a work vehicle, the method comprising:

receiving a signal associated with a load condition of the work vehicle, wherein the work vehicle includes the transmission having an input shaft, a counter shaft, and a first driven shaft and a second driven shaft extending parallel to the input and counter shafts;

determining a first desired clutch pressure for a first clutch associated with the first driven shaft based on the load condition;

determining a second desired clutch pressure for a second clutch associated with the second driven shaft based on the load condition;

controlling clutch valves associated with the first and second clutches such that the hydraulic fluid is supplied within the first clutch at the first desired clutch pressure and the hydraulic fluid is supplied within the second clutch at the second desired clutch pressure;

determining a desired system pressure for the hydraulic fluid supplied to the transmission based on the first and second desired clutch pressures, wherein determining the desired system pressure for the hydraulic fluid supplied to the transmission comprises setting the desired system pressure to a pressure above the greater of the first desired clutch pressure and the second desired clutch pressure; and controlling a system valve such that the hydraulic fluid is supplied to the clutch valves at the desired system pressure.

2. The method of claim 1, wherein receiving the signal associated with the load condition of the work vehicle comprises receiving a signal associated with a torque load of at least one of an engine or the transmission of the work vehicle.

3. The method of claim 1, further comprising:
analyzing past load conditions of the work vehicle; and
adjusting the desired system pressure based on the past load conditions while maintaining the desired system pressure above the greater of the first desired clutch pressure and the second desired clutch pressure.

4. The method of claim 1, wherein the first desired clutch pressure corresponds to a minimum pressure sufficient to transfer torque through the first clutch at the load condition without the first clutch slipping, and the second desired clutch pressure corresponds to a minimum pressure sufficient to transfer torque through the second clutch at the load condition without the second clutch slipping.

5. The method of claim 1, further comprising:
determining whether clutch slippage has occurred for at least one of the first clutch or the second clutch; and
adjusting at least one of the first desired clutch pressure or the second desired clutch pressure in the event clutch slippage has occurred.

6. The method of claim 1, further comprising:
predicting a future load condition of the work vehicle; and
adjusting at least one of the desired pressures based on the predicted future load condition.

7. A system configured to control pressure of hydraulic fluid supplied within a transmission of a work vehicle, the system comprising:
an engine;
a transmission coupled to the engine, the transmission including an input shaft, a counter shaft, and a first driven shaft and a second driven shaft extending parallel to the input and counter shafts;
a first clutch associated with the first driven shaft and a second clutch associated with the second driven shaft;
a system valve configured to regulate the pressure of the hydraulic fluid supplied to the transmission;
a first clutch valve associated with the first clutch and a second clutch valve associated with the second clutch; and
a controller communicatively coupled to the system valve and to the first and second clutch valves, the controller being configured to monitor a load condition of the engine, the transmission, or a combination thereof, and to:
determine a first desired clutch pressure for the first clutch based on the load condition;
determine a second desired clutch pressure for the second clutch based on the load condition;
control the first and second clutch valves such that the hydraulic fluid is supplied within the first clutch at the first desired clutch pressure and the hydraulic fluid is supplied within the second clutch at the second desired clutch pressure;
determine a desired system pressure for the hydraulic fluid supplied to the transmission based on the first and second desired clutch pressures, wherein the desired system pressure is set to a pressure above the greater of the first desired clutch pressure and the second desired clutch pressure; and
control the system valve such that the hydraulic fluid is supplied to the first and second clutch valves at the desired system pressure.

8. The system of claim 7, comprising a torque sensor communicatively coupled to the controller, the torque sensor being configured to monitor a torque load of at least one of the engine or the transmission.

9. The system of claim 7, wherein the controller is configured to analyze past load conditions of at least one of the engine or the transmission and adjust the desired system pressure based on the past load conditions while maintaining the desired system pressure above the greater of the first desired clutch pressure and the second desired clutch pressure.

10. The system of claim 7, wherein the first desired clutch pressure corresponds to a minimum pressure sufficient to transfer torque through the first clutch at the load condition without the first clutch slipping, and the second desired clutch pressure corresponds to a minimum pressure sufficient to transfer torque through the second clutch at the load condition without the second clutch slipping.

11. The system of claim 7, wherein the controller is further configured to increase the desired system pressure in the event that the controller detects clutch slippage for at least one of the clutches.

12. The system of claim 7, wherein the controller is further configured to predict a future load condition of at least one of the engine or the transmission and adjust at least one of the desired pressures based on the predicted future load condition.

* * * * *